United States Patent
Lee et al.

(10) Patent No.: US 10,126,562 B2
(45) Date of Patent: Nov. 13, 2018

(54) APPARATUS AND METHODS FOR REDUCING MOIRE FRINGE

(71) Applicant: Samsung Electronics Co., Ltd., Suwon-si, Gyeonggi-do (KR)

(72) Inventors: Jinho Lee, Suwon-si (KR); Tao Hong, Chaoyang District Beijing (CN); Weiming Li, Chaoyang District Beijing (CN); DongKyung Nam, Yongin-si (KR); Kang Xue, Chaoyang District Beijing (CN); Xiying Wang, Chaoyang District Beijing (CN); Zhihua Liu, Chaoyang District Beijing (CN); Gengyu Ma, Chaoyang District Beijing (CN); Haitao Wang, Chaoyang District Beijing (CN); Mingcai Zhou, Chaoyang District Beijing (CN)

(73) Assignee: Samsung Electronics Co., Ltd., Gyeonggi-do (KR)

( * ) Notice: Subject to any disclaimer, the term of this patent is extended or adjusted under 35 U.S.C. 154(b) by 259 days.

(21) Appl. No.: 15/000,658

(22) Filed: Jan. 19, 2016

(65) Prior Publication Data

US 2016/0234480 A1 Aug. 11, 2016

(30) Foreign Application Priority Data

Feb. 9, 2015 (CN) .......................... 2015 1 0067991
Sep. 8, 2015 (KR) .................... 10-2015-0126858

(51) Int. Cl.
*G02B 27/22* (2018.01)
*H04N 13/305* (2018.01)
(Continued)

(52) U.S. Cl.
CPC .......... *G02B 27/22* (2013.01); *H04N 13/0404* (2013.01); *H04N 13/0415* (2013.01);
(Continued)

(58) Field of Classification Search
CPC .......... G02B 27/22; H04N 5/21; H04N 13/04; H04N 13/305
See application file for complete search history.

(56) References Cited

U.S. PATENT DOCUMENTS 5,459,578 A * 10/1995 Park ...................... G01B 11/002
                                                    250/237 G
5,698,069 A * 12/1997 Aiyer ................... G01N 21/8806
                                                    356/239.2
(Continued)

FOREIGN PATENT DOCUMENTS

| CN | 102289779 A | 12/2011 |
|----|----|----|
| JP | 4979558 B2 | 7/2012 |
| JP | 2014-021053 A | 2/2014 |

OTHER PUBLICATIONS

Kim et al., "Color moiré pattern simulation and analysis in three-dimensional integral imaging for finding the moire-reduced tilted angle of a lens array," School of Electrical Engineering, Seoul National University, Apr. 2009, *Applied Optics*, vol. 48 (No. 11), pp. 2178-2187.

(Continued)

*Primary Examiner* — Dung Nguyen
(74) *Attorney, Agent, or Firm* — Harness, Dickey & Pierce, P.L.C.

(57) ABSTRACT

A method for reducing a moire fringe includes calculating a moire fringe width for each of different angles between a microlens array and pixels of a display screen. The method includes determining, to be a final inclination angle between the microlens array and the pixels of the display screen, one of the different inclination angles that corresponds to a minimum width among the calculated moire fringe widths.

20 Claims, 12 Drawing Sheets

(51) Int. Cl.
*H04N 13/04* (2006.01)
*H04N 13/327* (2018.01)
*H04N 5/21* (2006.01)

(52) U.S. Cl.
CPC ....... *H04N 13/0425* (2013.01); *H04N 13/305* (2018.05); *H04N 13/327* (2018.05); *H04N 5/21* (2013.01)

(56) References Cited

U.S. PATENT DOCUMENTS 6,075,893 A * 6/2000 Brandstetter .......... G01B 11/26
356/605
8,467,592 B2 * 6/2013 Wang ..................... G06T 7/001
382/141

OTHER PUBLICATIONS

Tanaka et al. "A visual marker for precise pose estimation based on a microlens array." National Institute of Advanced Industrial Science and Technology, Nov. 2012, 21st International Conference on Pattern Recognition (ICPR 2012), pp. 837-840.

* cited by examiner

Graph of maximum values of
moire fringe width, $P_{I,H} = 1.15$

Graph of maximum values of
moire fringe width, $P_{I,H} = 1.25$

Graph of maximum values of
moire fringe width, $P_{I,H} = 1.35$

Graph of maximum values of
moire fringe width, $P_{I,H} = 1.5$

Graph of maximum values of
moire fringe width, $P_{I,H} = 1.8$

Graph of maximum values of
moire fringe width, $P_{I,H} = 1.9$

Graph of maximum values of
moire fringe width, $P_{I,H} = 1.25$

Graph of maximum values of
moire fringe width, $P_{I,H} = 1.2$

Graph of maximum values of
moire fringe width, $P_{I,H} = 1.6$

Graph of maximum values of
moire fringe width, $P_{I,H} = 1.8$

# APPARATUS AND METHODS FOR REDUCING MOIRE FRINGE

CROSS-REFERENCE TO RELATED APPLICATION

This application claims priority under 35 U.S.C. § 119 to Chinese Patent Application No. 201510067991.X, filed on Feb. 9, 2015, in the State Intellectual Property Office of The P.R.C., and Korean Patent Application No. 10-2015-0126858, filed on Sep. 8, 2015, in the Korean Intellectual Property Office, the entire contents of each of which are incorporated herein by reference in their entirety.

BACKGROUND

1. Field

At least one example embodiment relates to a three-dimensional (3D) display, and more particularly, to an apparatus and/or a method for reducing a width of a moire fringe that may be generated in a 3D display.

2. Description of the Related Art

Recently, technology for a glassless three-dimensional (3D) display has developed rapidly because the technology enables viewing of 3D images without special devices such as, for example, polarizing glasses and a helmet.

A general glassless 3D display may include a display screen and an optical modulator. The optical modulator may include a slit raster, a cylindrical lens raster, and a microlens array. Through an interaction between the optical modulator in a periodically arranged raster structure and the display screen in which pixels are periodically arranged, a moire fringe may be generated.

A rotation of the optical modulator at an angle may form a dense moire fringe. In such a case, the optical modulator may need to estimate an inclination angle between the display screen and the optical modulator, which corresponds to a minimum moire fringe width. The optical modulator may measure a moire fringe width at a current inclination angle, adjust the inclination angle based on the measured moire fringe width, and re-calculate a moire fringe width at the adjusted inclination angle.

SUMMARY

At least one example embodiment relates to a method of reducing a moire fringe.

In at least one example embodiment, the method may include calculating a moire fringe width for each of different inclination angles between a microlens array and pixels of a display screen, and determining, to be a final inclination angle between the microlens array and the pixels of the display screen, an inclination angle corresponding to a minimum width among the calculated moire fringe widths.

The calculating of the moire fringe width may include calculating the moire fringe width based on different intervals between the pixels of the display screen or different widths of a unit microlens of the microlens array.

In a case of the unit microlens being a hexagon, the different widths of the unit microlens may include at least one of a horizontal width of the unit microlens, a vertical width of the unit microlens, and a diagonal width of the unit microlens.

In a case of the unit microlens being a quadrangle, the different widths of the unit microlens may include at least one of a horizontal width of the unit microlens and a diagonal width of the unit microlens.

The calculating of the moire fringe width may include calculating the moire fringe width based on a width of a unit microlens of the microlens array when the microlens array is projected to the display screen.

The width of the unit microlens of the microlens array when the microlens array is projected to the display screen may be determined based on at least one of a preset user viewing distance, a distance between the display screen and the microlens array, and a width of the unit microlens of the microlens array.

The different inclination angles between the microlens array and the pixels of the display screen may include at least one of an inclination angle formed between the microlens array and a vertical interval between the pixels and an inclination angle formed between the microlens array and a horizontal interval between the pixels.

The determining of the final inclination angle between the microlens array and the pixels of the display screen may include determining a value combination by matching the inclination angle to an interval between the pixels, and determining a graph of the value combination and the moire fringe width by calculating the moire fringe width based on the value combination.

At least one example embodiment relates to an apparatus for reducing a moire fringe.

In at least one example embodiment, the apparatus may include a moire fringe width calculator configured to calculate a moire fringe width for each of different inclination angles between a microlens array and pixels of a display screen, and an inclination angle determiner configured to determine, to be a final inclination angle between the microlens array and the pixels of the display screen, an inclination angle corresponding to a minimum width among the calculated moire fringe widths.

The moire fringe width calculator may calculate the moire fringe width based on different intervals between the pixels of the display array or different widths of a unit microlens of the microlens array.

The moire fringe width calculator may calculate the moire fringe width based on a width of a unit microlens of the microlens array when the microlens array is projected to the display screen.

The width of the unit microlens of the microlens array when the microlens array is projected to the display screen may be determined based on at least one of a preset user viewing distance, a distance between the display screen and the microlens array, and a width of the unit microlens of the microlens array.

The different inclination angles between the microlens array and the pixels of the display screen may include at least one of an inclination angle formed between the microlens array and a vertical interval between the pixels, and an inclination angle formed between the microlens array and a horizontal interval between the pixels.

The apparatus may include the display screen.

At least one example embodiment relates to a non-transitory computer-readable medium including program code that, when executed by a processor, performs the method of reducing a moire fringe.

Additional aspects of example embodiments will be set forth in part in the description which follows and, in part, will be apparent from the description, or may be learned by practice of the disclosure.

BRIEF DESCRIPTION OF THE DRAWINGS

These and/or other aspects will become apparent and more readily appreciated from the following description of example embodiments, taken in conjunction with the accompanying drawings of which.

DETAILED DESCRIPTION

Figure 1:
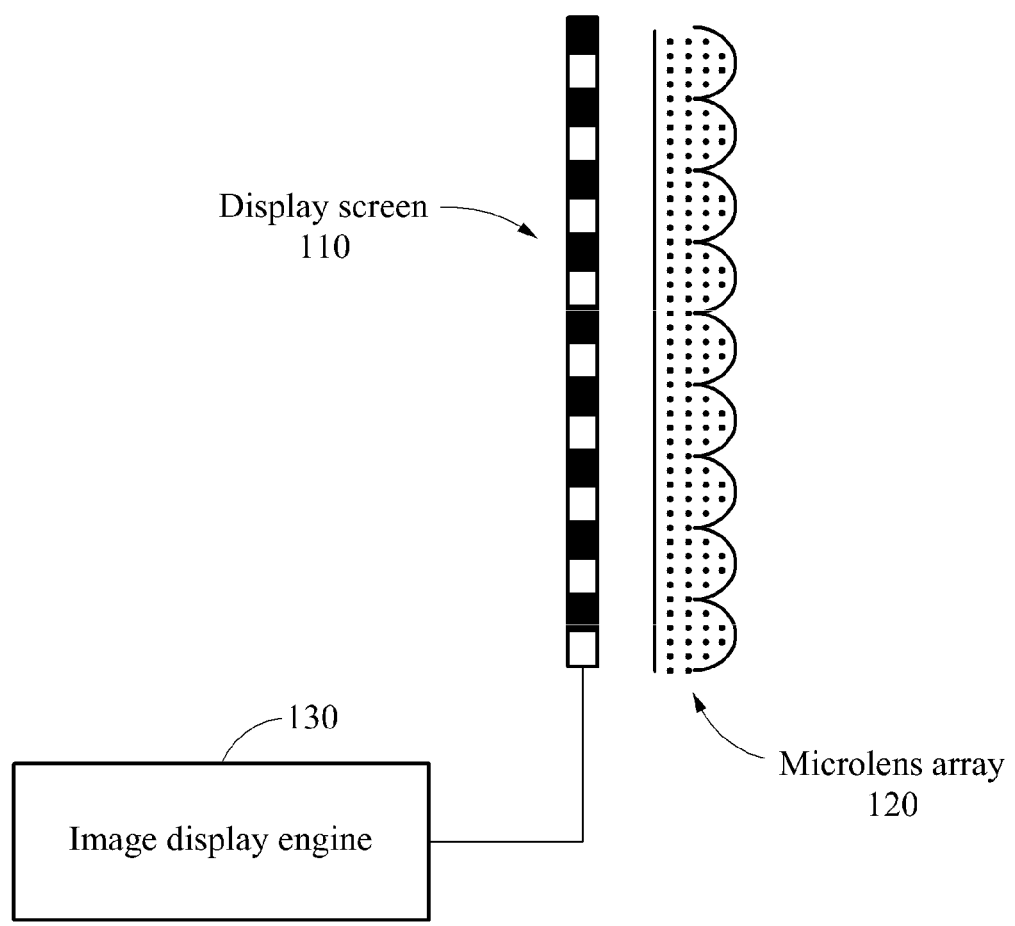
FIG. 1 is a diagram illustrating a structure of a three-dimensional (3D) display according to at least one example embodiment.

Hereinafter, some example embodiments will be described in detail with reference to the accompanying drawings. Regarding the reference numerals assigned to the elements in the drawings, it should be noted that the same elements will be designated by the same reference numerals, wherever possible, even though they are shown in different drawings. Also, in the description of embodiments, detailed description of well-known related structures or functions will be omitted when it is deemed that such description will cause ambiguous interpretation of the present disclosure.

It should be understood, however, that there is no intent to limit this disclosure to the particular example embodiments disclosed. On the contrary, example embodiments are to cover all modifications, equivalents, and alternatives falling within the scope of the example embodiments. Like numbers refer to like elements throughout the description of the figures.

In addition, terms such as first, second, A, B, (a), (b), and the like may be used herein to describe components. Each of these terminologies is not used to define an essence, order or sequence of a corresponding component but used merely to distinguish the corresponding component from other component(s).

The terminology used herein is for the purpose of describing particular embodiments only and is not intended to be limiting. As used herein, the singular forms "a," "an," and "the," are intended to include the plural forms as well, unless the context clearly indicates otherwise. It will be further understood that the terms "comprises," "comprising," "includes," and/or "including," when used herein, specify the presence of stated features, integers, steps, operations, elements, and/or components, but do not preclude the presence or addition of one or more other features, integers, steps, operations, elements, components, and/or groups thereof.

It should also be noted that in some alternative implementations, the functions/acts noted may occur out of the order noted in the figures. For example, two figures shown in succession may in fact be executed substantially concurrently or may sometimes be executed in the reverse order, depending upon the functionality/acts involved.

FIG. 1 is a diagram illustrating a structure of a three-dimensional (3D) display according to at least one example embodiment. Referring to FIG. 1, the 3D display includes a display screen 110 and a microlens array 120. At least one pixel may be periodically arranged in the display screen 110.

In addition, an image display engine 130 may be connected to the display screen 110. It should be understood that the image display engine 130, the display screen 110, and the microlens array 120 may be incorporated into the same apparatus or implemented as separate elements. The image display engine 130 may transfer a signal to the pixel included in the display screen 110. Thus, the image display engine 130 may output an image to the display screen 110. A graphics card with image processing capabilities (i.e., a special purpose processor) may be provided as an example of the image display engine 130, but example embodiments are not limited thereto.

The microlens array 120 may include at least one unit microlens. The unit microlens may be periodically arranged. In addition, the unit microlens may be arranged in a vertical direction and/or in a horizontal direction. The microlens array 120 may provide a parallax in the vertical direction and/or in the horizontal direction, and thus a user may view a 3D stereoscopic image.

The unit microlens may be arranged in parallel with a direction in which the pixel of the display screen 110 is arranged. Alternatively, the unit microlens may be arranged to have an inclination angle against the direction in which the pixel of the display screen 110 is arranged. Since both the microlens array 120 and the display screen 110 include periodically arranged elements, for example, the unit microlens and the pixel, the microlens array 120 and the display screen 110 may interact with each other to generate a moire fringe.

A width of the moire fringe, which is also referred to as a moire fringe width herein, may change depending on an inclination angle, and thus the moire fringe width may be reduced (or alternatively, minimized) by adjusting the inclination angle. According to an example embodiment, an apparatus for reducing a moire fringe, hereinafter simply referred to as a moire fringe reducing apparatus (e.g., image display engine 130), may be provided. The moire fringe reducing apparatus may include a moire fringe width calculator configured to calculate a moire fringe width for each of different inclination angles between a microlens array, for example, the microlens array 120, and pixels of a display screen, for example, the display screen 110, and an inclination angle determiner configured to determine an inclination angle corresponding to a minimum width among the calculated moire fringe widths to be a final inclination angle between the microlens array and the pixels of the display screen. The moire fringe reducing apparatus may communicate the final inclination angle to a user (e.g., via a display or other interface) so that the microlens array 120 can be adjusted to achieve the final inclination angle.

According to another example embodiment, a method of reducing a moire fringe, hereinafter simply referred to as a moire fringe reducing method, may be provided. The moire fringe reducing method may include calculating a moire fringe width for each of different inclination angles between a microlens array, for example, the microlens array 120, and pixels of a display screen, for example, the display screen 110, and determining an inclination angle corresponding to a minimum width among the calculated moire fringe widths to be a final inclination angle between the microlens array and the pixels of the display screen. The image display engine 130 may carry out the above described functions of the moire fringe reducing apparatus.

Figure 2:
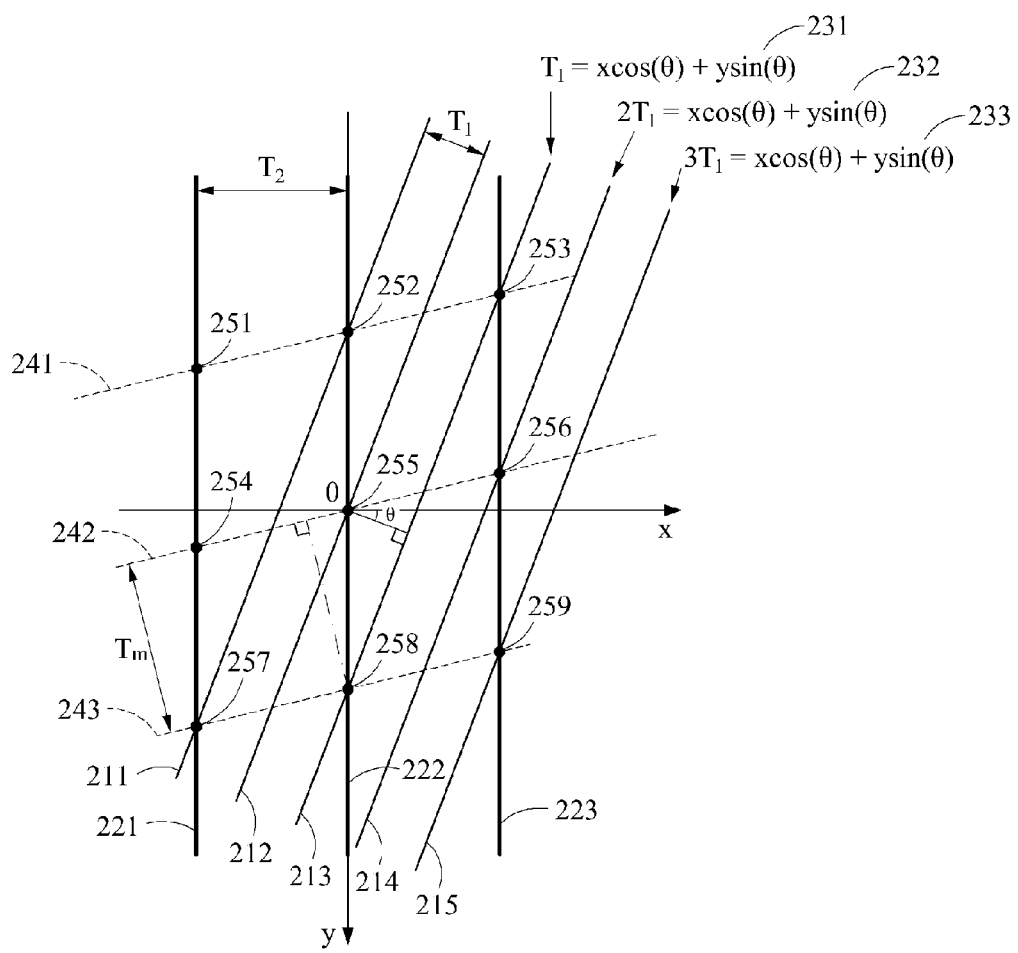
FIG. 2 is a diagram illustrating a moire fringe according to at least one example embodiment.

FIG. 2 is a diagram illustrating a moire fringe according to at least one example embodiment. According to an example embodiment, a 3D display including a unit microlens which is arranged to form an inclination angle in a direction in which a pixel of a display screen is arranged. Since the microlens array and the display screen may include periodically arranged elements, for example, the unit microlens and the pixel, the microlens array and the display screen may interact with each other, and thus a moire fringe may be generated. In FIG. 2, a periodically arranged unit microlens and a periodically arranged pixel are simplified with a straight line to illustrate a moire fringe.

Referring to FIG. 2, lines on a coordinate plane including x and y axes are illustrated for a pixel and a microlens. Pixels periodically arranged in a display screen are expressed by straight lines, for example a straight line 221, a straight line 222, and a straight line 223. The pixels are arranged in a direction in parallel with a direction of the y axis, and arranged at intervals of $T_2$ in a direction of the x axis. Unit microlenses periodically arranged in a microlens array are expressed by straight lines, for example, a straight line 211, a straight line 212, a straight line 213, a straight line 214, and a straight line 215. The unit microlenses form an inclination angle $\theta$ against the y axis, and are arranged at intervals of $T_1$.

As illustrated in FIG. 2, the pixels of the display screen are periodically arranged in the direction in parallel with the y axis at the intervals of $T_2$, and the unit microlenses of the microlens array are periodically arranged at the intervals of $T_1$. In addition, the unit microlenses are arranged by being inclined at the inclination angle $\theta$ against the direction in which the pixels are arranged, which is in parallel with the y axis.

Here, a unit microlens corresponding to a straight line having a smallest positive number in an x-intercept is referred to as a first (m=1) unit microlens. Here, a value of "m" may increase by 1 along the direction of the x axis. As illustrated in FIG. 2, the straight line 213 corresponds to a first unit microlens, and the straight line 214 corresponds to a second unit microlens. In such a case, a straight line for an m-th unit microlens may be expressed as in Equation 1.

$$mT_1 = x\cos(\theta) + y\sin(\theta) \quad \text{[Equation 1]}$$

In Equation 1, when substituting 1 for "m," equation 231 corresponding to the straight line 213 for the first unit microlens may be obtained. When substituting 2 for m, equation 232 corresponding to the straight line 214 for the second unit microlens may be obtained. When substituting 3 for m, equation 233 corresponding to the straight line 215 for a third unit microlens may be obtained.

An intersection point between the straight line 223 and a straight line for the m-th unit microlens may be expressed as $(T_2, y_{1m})$. As illustrated in FIG. 2, coordinates of an intersection point 256 between the straight line 223 for the display screen and the straight line 214 for the second unit microlens are $(T_2, y_{12})$. Similarly, coordinates of an intersection point 259 between the straight line 223 and the straight line 215 for the third unit microlens are $(T_2, y_{13})$. Since such intersection points are located on the straight line for the m-th unit microlens, $(T_2, y_{1m})$ may satisfy an equation $mT_1 = T_2\cos(\theta) + y_{1m}\sin(\theta)$.

In addition, the straight line 222 is on the y axis, and thus an intersection point between the straight line 222 and the straight line for the m-th unit microlens may be expressed as $(0, y_{0m})$. As illustrated in FIG. 2, coordinates of an intersection point 258 between the straight line 222 and the straight line 213 for the first unit microlens are $(0, y_{01})$.

The straight lines 221, 222, and 223 for the display screen intersect with the straight lines 211, 212, 213, 214, and 215 for the microlens array to form the intersection points 251, 252, 253, 254, 255, 256, 257, 258, and 259. Lines 241, 242, and 243 connecting the intersection points may correspond to a moire fringe. Thus, an interval $T_m$ among the lines 241, 242, and 243 corresponding to the moire fringe may correspond to a period of the moire fringe.

Based on Equation 1 and the description provided with reference to FIG. 2, Equation 2 for calculating a period $T_m$ of a moire fringe may be derived. In addition, Equation 3 for calculating a direction angle $\alpha$ of the moire fringe may be derived.

$$T_m = |y_{01}|\cos(\alpha) = \quad \text{[Equation 2]}$$
$$\left|\frac{T_1}{\sin(\theta)}\right|\cos(\alpha) = \left|\frac{T_1}{\sin(\theta)}\right|\frac{T_2}{\sqrt{\left(\frac{MT_1 - T_2\cos(\theta)}{\sin(\theta)}\right)^2 + T_2^2}} =$$
$$\frac{T_1 T_2}{\sqrt{(MT_1)^2 + T_2^2 - 2MT_1T_2\cos(\theta)}}$$

$$\alpha = \tan^{-1}\left(\frac{y_{1M}}{T_2}\right) = \tan^{-1}\left(\frac{MT_1 - T_2\cos(\theta)}{T_2\sin(\theta)}\right) \quad \text{[Equation 3]}$$

$$M = \text{round}\left(\frac{T_2\cos(\theta)}{T_1}\right) \quad \text{[Equation 4]}$$

In Equation 2, "M" is defined as in Equation 4. In Equation 4, "round( )" denotes a function performing at least one of rounding up and rounding down from a digit at a position of a number.

According to an example embodiment, a moire fringe reducing apparatus (e.g., image display engine 130) may change an inclination angle $\theta$ of Equation 2 to calculate a moire fringe width with respect to different inclination angles. The moire fringe reducing apparatus may detect an inclination angle $\theta$ corresponding to a minimum width among moire fringe widths. In addition, the moire fringe reducing apparatus may determine the inclination angle $\theta$ corresponding to the minimum width to be a final inclination angle between the microlens array and the pixels of the display screen.

According to another example embodiment, the microlens array and the display screen may be separate from each other. Referring back to FIG. 1, the 3D display in which the microlens array 120 and the display screen 110 are separate from each other may be provided. Referring to FIG. 2, Equation 4 is derived from an example embodiment in which the straight lines 221, 222, and 223 for the display screen and the straight lines 211, 212, 213, 214, and 215 are arranged in the same coordinate plane. Thus, an error may occur when applying Equation 4 to an example embodiment in which the microlens array and the display screen are separate from each other.

The moire fringe reducing apparatus may calculate a moire fringe width based on the separation between the microlens array and the display screen. For example, the moire fringe reducing apparatus may calculate a moire fringe width $T_m$ based on a width $T_1'$ of a unit microlens of the microlens array when the microlens array is projected to the display screen. The moire fringe reducing apparatus may calculate $T_1'$ based on Equation 5.

$$T_1' = \frac{D+g}{D} P_L \quad \text{[Equation 5]}$$

In Equation 5, "$P_L$" denotes a width of the unit microlens of the microlens array, and "g" denotes a distance between the display screen and the microlens array. "D" denotes a preset viewing distance of a user. The viewing distance may be a distance between the user and the display screen. Alternatively, the viewing distance may be selected as a suitable value based on a 3D display viewing environment.

When the microlens array is projected to the display screen, a width $T_1'$ of a unit microlens of the microlens array projected to the display screen and an interval $T_2$ between the pixels of the display screen are located on a same plane. In such a case, Equation 6 for calculating the moire fringe width $T_m$ may be derived by modifying Equation 4. In addition, Equation 8 for calculating the direction angle α of a moire fringe width may be derived from Equation 3.

$$T_m = \frac{T_1' T_2}{\sqrt{(MT_1')^2 + T_2^2 - 2MT_1' T_2 \cos(\theta)}} \quad \text{[Equation 6]}$$

$$M = \text{round}\left(\frac{T_2 \cos(\theta)}{T_1'}\right) \quad \text{[Equation 7]}$$

$$\alpha = \tan^{-1}\left(\frac{y_{1M}}{T_2}\right) = \tan^{-1}\left(\frac{MT_1' - T_2 \cos(\theta)}{T_2 \sin(\theta)}\right) \quad \text{[Equation 8]}$$

In Equation 6, "M" is defined as in Equation 7 based on $T_1'$ and Equation 4. "θ" denotes an inclination angle between a unit microlens projected to the display screen and a pixel of the display screen.

According to at least one example embodiment, the moire fringe reducing apparatus may calculate a moire fringe width based on a width of a unit microlens of the microlens array when the microlens array is projected to the display screen. According to at least one example embodiment, the width of the unit microlens of the microlens array when the microlens array is projected to the display screen may be determined based on at least one of the preset viewing distance, the distance between the display screen and the microlens array, and the width of the unit microlens of the microlens array.

Figure 3:
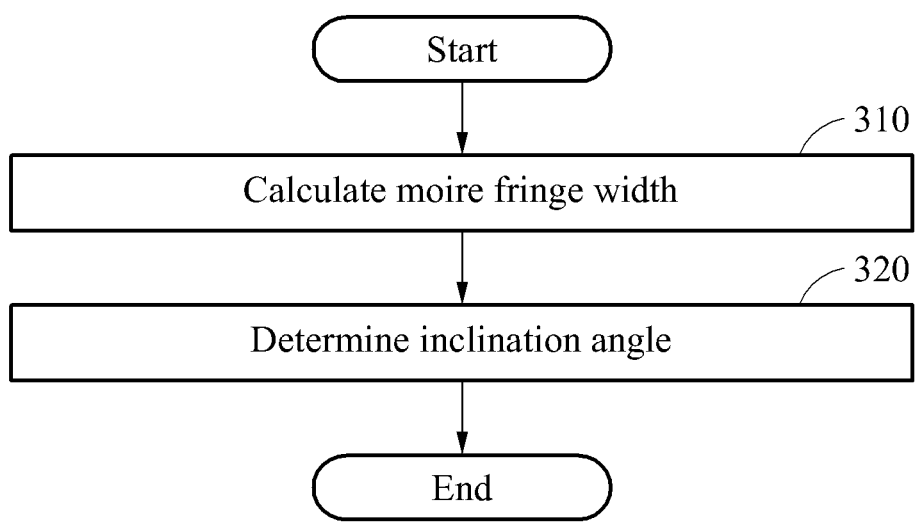
FIG. 3 is a flowchart illustrating a method of reducing a moire fringe to be performed by an apparatus for reducing a moire fringe according to at least one example embodiment.

FIG. 3 is a flowchart illustrating a moire fringe reducing method to be performed by a moire fringe reducing apparatus according to at least one example embodiment. According to at least one example embodiment, the moire fringe reducing method and the moire fringe reducing apparatus performing the method are provided. The moire fringe reducing method may include calculating a moire fringe width for each of different inclination angles between a microlens array and pixels of a display screen and determining, to be a final inclination angle between the microlens array and the pixels of the display screen, an inclination angle corresponding to a minimum width among the calculated moire fringe widths.

Referring to FIG. 3, in operation 310, the moire fringe reducing apparatus (e.g., image display engine 130) calculates a moire fringe width $T_m$ for each of different inclination angles θ between the microlens array and the pixels of the display screen. For example, in operation 310, the moire fringe reducing apparatus may calculate the moire fringe width $T_m$ based on different intervals $T_2$ between the pixels included in the display screen or different widths $T_1$ of a unit microlens of the microlens array.

In operation 310, the moire fringe reducing apparatus may calculate the moire fringe width $T_m$ based on Equation 2. For example, the moire fringe reducing apparatus may calculate "M" of Equation 2 based on Equation 4. For another example, the moire fringe reducing apparatus may calculate a direction angle α of a moire fringe based on Equation 3.

In operation 310, the moire fringe reducing apparatus may calculate $T_1'$ based on Equation 5. The moire fringe reducing apparatus may determine a width $T_1'$ of a unit microlens of the microlens array when the microlens array is projected to the display screen, based on at least one of a present viewing distance D of a user, a distance g between the display screen and the microlens array, and a width $P_L$ of a unit microlens of the microlens array.

In operation 310, the moire fringe reducing apparatus may calculate the moire fringe width $T_m$ based on the width $T_1'$ of the unit microlens of the microlens array when the microlens array is projected to the display screen. For example, the moire fringe reducing apparatus may determine $T_m$ based on Equation 6. The moire fringe reducing apparatus may determine "M" of Equation 6 based on Equation 7. For another example, the moire fringe reducing apparatus may calculate the direction angle α of a moire fringe based on Equation 8.

In operation 320, the moire fringe reducing apparatus determines, to be a final inclination angle θ' between the microlens array and the pixels of the display screen, an inclination angle θ corresponding to a minimum width among the calculated moire fringe widths $T_m$. For example, the moire fringe reducing apparatus may detect the minimum width among the calculated moire fringe widths $T_m$. The moire fringe reducing apparatus may identify the inclination angle corresponding to the detected minimum width. The moire fringe reducing apparatus may set the identified inclination angle to be the final inclination angle between the microlens array and the pixels of the display screen.

A person having ordinary skill in the art may readily set or adjust an inclination angle between the microlens array and the pixels of the display screen. For another example, in operation 320, the moire fringe reducing apparatus may generate a value combination by matching an interval between the pixels and the inclination angle, calculate a moire fringe width based on the value combination, and determine a graph of the value combination and the moire fringe width. The moire fringe reducing apparatus may output the determined graph. The graph may be output in any one form of a display, a printer, a non-transitory computer-readable medium, but may not be limited thereto.

Figure 4:
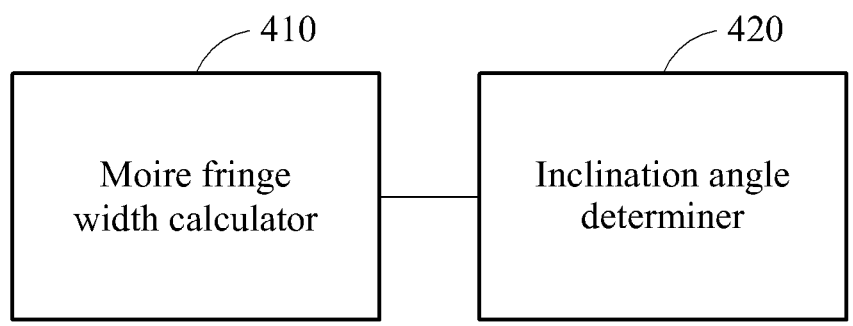
FIG. 4 is a diagram illustrating an apparatus for reducing a moire fringe according to at least one example embodiment.

FIG. 4 is a diagram illustrating a moire fringe reducing apparatus according to at least one example embodiment. Referring to FIG. 4, the moire fringe reducing apparatus (e.g., image display engine 130) is provided, which includes a moire fringe width calculator 410 configured to calculate a moire fringe width for each of different inclination angles between a microlens array and pixels of a display screen, and an inclination angle determiner 420 configured to determine, to be a final inclination angle between the microlens array and the pixels of the display screen, an inclination angle corresponding to a minimum width among the calculated moire fringe widths.

According to an example embodiment, the moire fringe width calculator 410 may calculate a moire fringe width $T_m$ for each of different inclination angles θ between the microlens array and the pixels of the display screen. The moire fringe width calculator 410 may calculate the moire fringe width $T_m$ based on different intervals $T_2$ between the pixels included in the display screen or different widths $T_1$ of a unit microlens of the microlens array.

The moire fringe width calculator 410 may calculate the moire fringe width $T_m$ based on Equation 2. The moire fringe width calculator 410 may calculate "M" of Equation 2 based on Equation 4. The moire fringe width calculator 410 may calculate a direction angle α of a moire fringe based on Equation 3.

For example, a 3D display in which the microlens array and the display screen are separate from each other may be provided. Here, the moire fringe width calculator 410 may calculate the moire fringe width $T_m$ based on a width $T_1'$ of a unit microlens of the microlens array when the microlens array is projected to the display screen.

The width $T_1'$ of the unit microlens of the microlens array when the microlens array is projected to the display screen may be determined based on at least one of a preset viewing distance D of a user, a distance g between the display screen and the microlens array, and a width $P_L$ of a unit microlens of the microlens array. The moire fringe width calculator 410 may calculate $T_1'$ based on Equation 5.

The moire fringe width calculator 410 may determine $T_m$ based on Equation 6. The moire fringe width calculator 410 may determine "M" of Equation 6 based on Equation 7. The moire fringe width calculator 410 may calculate the direction angle α of a moire fringe based on Equation 8.

The inclination angle determiner 420 may determine, to be a final inclination angle θ' between the microlens array and the pixels of the display screen, an inclination angle corresponding to a minimum width among the calculated moire fringe widths $T_m$. For example, the inclination angle determiner 420 may detect the minimum width among the calculated moire fringe widths $T_m$. The inclination angle determiner 420 may identify the inclination angle corresponding to the detected minimum width. The inclination angle determiner 420 may set the identified inclination angle to be the final inclination angle between the microlens array and the pixels of the display screen.

Alternatively, the inclination angle determiner 420 may generate a value combination by matching an interval between the pixels and the inclination angle. The inclination angle determiner 420 may determine a graph of the value combination and the moire fringe width by calculating the moire fringe width based on the value combination. The inclination angle determiner 420 may output the determined graph.

Figure 5A:
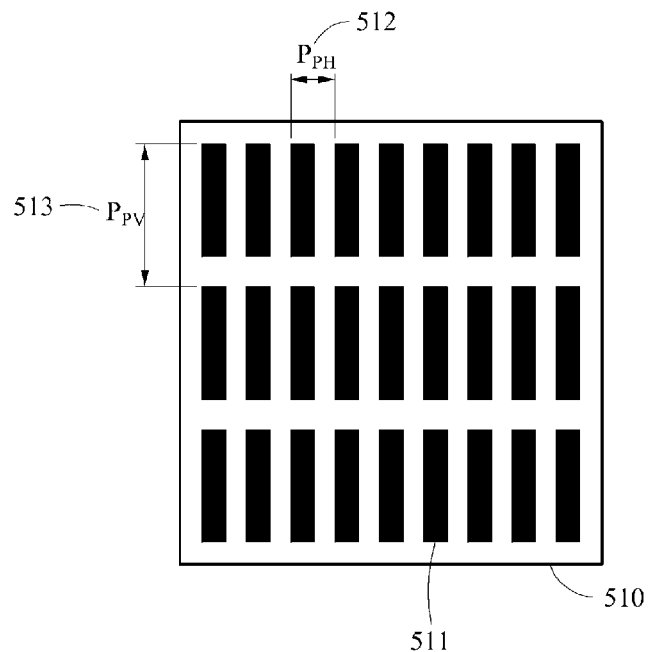
FIGS. 5A and 5B are diagrams illustrating a structure of a display screen in which pixels are arranged according to at least one example embodiment.
Figure 5B:
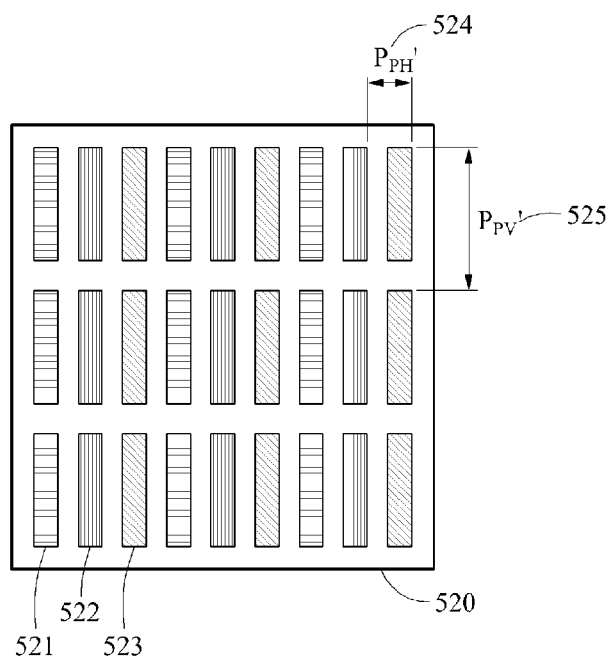

FIGS. 5A and 5B are diagrams illustrating a structure of a display screen in which pixels are arranged according to at least one example embodiment. A moire fringe may be generated through an interaction between periodically arranged unit microlenses and periodically arranged pixels.

Referring to an example structure 510 of the display screen illustrated in FIG. 5A, the display screen includes periodically arranged pixels 511 and spaces among the pixels 511. A moire fringe may be generated through an interaction between the pixels 511 and a microlens array.

In the structure 510, the pixels 511 may be periodically arranged in a horizontal and/or vertical direction, and the pixels 511 may be arranged separately from one another. Thus, a moire fringe may be formed through an interaction between the periodical arrangement of the pixels 511 in the horizontal direction and the microlens array. Also, a moire fringe may be formed through an interaction between the periodical arrangement of the pixels 511 in the vertical direction and the microlens array. In addition, a moire fringe may be formed through an interaction between the spaces among the pixels 511 and the microlens array.

According to an example embodiment, a moire fringe reducing apparatus (e.g., display engine 130) may calculate a moire fringe width for each of different inclination angles between the microlens array and the pixels 511 of the display screen. The different inclination angles between the microlens array and the pixels 511 of the display screen may include at least one of an inclination angle formed between a vertical interval between the pixels 511 and the microlens array and an inclination angle formed between a horizontal interval between the pixels 511 and the microlens array.

Referring to FIG. 5A, the moire fringe reducing apparatus may calculate a moire fringe width based on a horizontal interval $P_{PH}$ 512 between the pixels 511 and/or a vertical interval $P_{PV}$ 513 between the pixels 511. For example, the moire fringe reducing apparatus may calculate the moire fringe width by substituting $P_{PH}$ 512 and/or $P_{PV}$ 513 for $T_2$ in Equation 2.

In such an example, different values may be substituted for an inclination angle θ between the microlens array and the pixels 511 of the display screen based on a value of $T_2$. When the horizontal interval $P_{PH}$ 512 is substituted for $T_2$, the inclination angle may be an inclination angle between the horizontal direction of the pixels 511 and the microlens array. When the vertical interval $P_{PV}$ 513 is substituted for $T_2$, the inclination angle may be an inclination angle between the vertical direction of the pixels 511 and the microlens array.

In addition, since the pixels 511 are periodically arranged, the spaces among the pixels 511 may also be periodically repeated. Thus, a moire fringe may be generated through an interaction between the spaces among the pixels 511 and the microlens array. Since the pixels 511 are arranged separately from one another, the spaces among the pixels 511 may also be periodically arranged in the horizontal direction and/or the vertical direction.

The moire fringe reducing apparatus may calculate a moire fringe width based on a horizontal interval and/or vertical interval between the spaces among the pixels 511. In the display screen, a width of the pixels 511 may equal a horizontal interval between the pixels 511. In such a case, the horizontal interval formed between the spaces among the pixels 511 may correspond to the horizontal interval between the pixels 511.

Referring to an example structure 520 of the display screen illustrated in FIG. 5B, one pixel includes sub-pixels in three different colors, for example, red, green, and blue. The display screen may output a color image by adjusting a brightness of the sub-pixels in the three different colors. In FIG. 5B, sub-pixels in the same color are illustrated by the same pattern. For example, a red sub-pixel 521 is illustrated by horizontal stripes, a green sub-pixel 522 is illustrated by vertical stripes, and a blue sub-pixel 523 is illustrated by diagonal stripes.

In such an example, the three sub-pixels form one pixel, and thus a horizontal interval $P_{PH}'$ 524 between the sub-pixels may be one third of a vertical interval $P_{PV}'$ 525 between the sub-pixels. The moire fringe reducing apparatus may calculate a moire fringe width based on the foregoing description that the horizontal interval is one third of the vertical interval.

For another example, in a case in which the display screen and the microlens array are separate, the moire fringe reducing apparatus may calculate a moire fringe width based on a width of a unit microlens of the microlens array when the microlens array is projected to the display array. In such an example, the moire fringe reducing apparatus may calculate the width of the unit microlens array projected to the display screen based on Equation 5.

In the case in which the display screen and the microlens array are separate from each other, the moire fringe reducing apparatus may calculate the moire fringe width by substituting $P_{PH}$ 512 and/or $P_{PV}$ 513 for $T_2$ in Equation 6. The moire fringe reducing apparatus may substitute the width of the unit microlens projected to the display screen for $T_1'$ in Equation 6. In such a case, "θ" in Equation 6 indicates an inclination angle formed between the unit microlens projected to the display screen and a pixel of the display screen.

Further, the display screen including the sub-pixels and the microlens array may separate. In such a case, the moire fringe reducing apparatus may calculate a moire fringe width based on a relationship between the horizontal interval $P_{PH}'$ 524 between the sub-pixels and the vertical interval $P_{PV}'$ 525 between the sub-pixels. Simultaneously, the moire fringe reducing apparatus may calculate the moire fringe width based on the width of the unit microlens when the microlens array is projected to the display screen.

Although the two different example structures of the display screen are illustrated herein, different forms or different periodical arrangements of pixels may be applicable. The other forms of pixels or sub-pixels may include a circle and a hexagon in addition to a quadrangle. The foregoing description may be applicable to the other forms of pixels or sub-pixels.

The periodical arrangements may be provided as examples, and thus other arrangements may be applicable. For example, three circular sub-pixels may be arranged in a triangular form, four circular sub-pixels may be arranged in a rhombus form, or six circular sub-pixels may be arranged in a hexagonal form. In addition, rectangular sub-pixels may have different areas or be arranged in different directions. For example, a pentile arrangement in which sub-pixels having different areas are arranged may be applicable. When pixels or sub-pixels are periodically arranged, a moire fringe may be generated through an interaction between a unit microlens and the periodically arranged microlens array. The foregoing descriptions of the example embodiments may be applicable to other forms of pixels or different periodical arrangements of the pixels.

Figure 6:
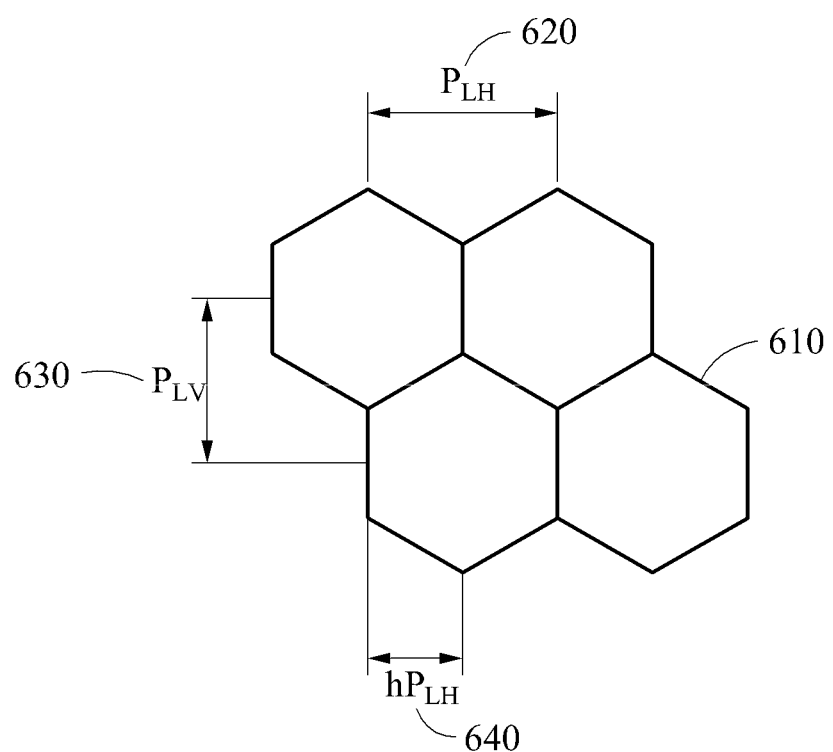
FIG. 6 is a diagram illustrating a microlens array in which a unit microlens is a hexagon according to at least one example embodiment.

FIG. 6 is a diagram illustrating a microlens array in which a unit microlens is a hexagon according to at least one example embodiment. Unit microlenses may be periodically arranged in the microlens array. The microlens array may include various forms (or shapes) of a unit microlens. The forms of a unit microlens may include, for example, a cylindrical (or circular) form, a quadrangular form, and a hexagonal form. However, the forms of a unit microlens may not be limited to the ones described in the foregoing.

Referring to FIG. 6, the microlens array includes a hexagonal unit microlens 610 which is periodically arranged. The hexagonal unit microlens 610 may be periodically arranged in a horizontal direction and/or a vertical direction. A horizontal width, a vertical width, and a diagonal width of the hexagonal unit microlens 610 may be different from one another. As illustrated in FIG. 6, a horizontal width $P_{LH}$ 620 and a vertical width $P_{LV}$ 630 are different from each other.

According to at least one example embodiment, a moire fringe reducing apparatus may calculate a moire fringe width based on different intervals between pixels included in a display screen or different widths of a unit microlens of the microlens array. For example, when a unit microlens is a hexagon, different widths of the unit microlens may include at least one of the horizontal width $P_{LH}$ 620, the vertical width $P_{LV}$ 630, and a diagonal width $hP_{LH}$ 640 as illustrated in FIG. 6.

When the microlens array includes the hexagonal unit microlens 610 and the display screen is provided in the first example structure 510 of FIG. 5, the moire fringe reducing apparatus may calculate a moire fringe width based on the horizontal interval $P_{PH}$ 512 between the pixels 511 and the horizontal width $P_{LH}$ 620 of the unit microlens 610. When the moire fringe reducing apparatus uses Equation 2, the horizontal width $P_{LH}$ 620 of the unit microlens 610 may be substituted for $T_1$ and the horizontal interval $P_{PH}$ 512 between the pixels 511 may be substituted for $T_2$. In addition, an inclination angle formed between the horizontal direction of the unit microlens 610 and the horizontal direction of the pixels 511 may be substituted for θ.

In addition, the moire fringe reducing apparatus may calculate a moire fringe width based on the vertical interval $P_{PV}$ 513 between the pixels 511 and the vertical width $P_{LV}$ 630 of the unit microlens 610. When the moire fringe reducing apparatus uses Equation 2, the vertical width $P_{LV}$ 630 of the unit microlens 610 may be substituted for $T_1$ and the vertical interval $P_{PV}$ 513 between the pixels 511 may be substituted for $T_2$. In addition, an inclination angle formed between the vertical direction of the unit microlens 610 and the vertical direction of the pixels 511 may be substituted to θ. When the moire fringe reducing apparatus calculates a moire fringe width based on the horizontal interval $P_{PH}$ 512 between the pixels 511 and the vertical width $P_{LV}$ 630 of the unit microlens 610, $P_{PH}$ 512 may be substituted for $T_1$ and $P_{LV}$ 630 may be substituted for $T_2$. In addition, an inclination angle formed between the vertical direction of the unit microlens 610 and the horizontal direction of the pixels 511 may be substituted for θ.

According to another example embodiment, the microlens array and the display screen may be separate from each other. In such a case, the moire fringe reducing apparatus may calculate a moire fringe width using Equation 6. The moire fringe reducing apparatus may calculate a moire fringe width based on a width of a unit microlens of the microlens array when the microlens array is projected to the display screen.

The moire fringe width may be calculated based on different widths of the unit microlens projected to the display screen. That is, a horizontal width, a vertical width, and a diagonal width of the unit microlens projected to the display screen may be substituted for $T_1'$ in Equation 6. In addition, $T_1'$ may be determined based on at least one of a preset viewing distance of a user, a distance between the display screen and the microlens array, and a width of a unit microlens of the microlens array. Also, $T_1'$ may be determined based on Equation 7.

As described in the foregoing, the moire fringe reducing apparatus may use the horizontal interval $P_{PH}$ 512 between the pixels 511 and the vertical interval $P_{PV}$ 513 between the pixels 511 as the different intervals, and the horizontal width $P_{LH}$ 620, the vertical width $P_{LV}$ 630, and the diagonal width $hP_{LH}$ 640 of the unit microlens 610 as the different widths of the unit microlens 610. Thus, the moire fringe reducing apparatus may calculate a moire fringe width based on six combinations of the different intervals between pixels 511 and the different widths of the unit microlens 610. In addition, an inclination angle θ may be determined based on the combinations of the different intervals and the different widths.

The moire fringe reducing apparatus may calculate a moire fringe width based on a relationship between a horizontal width and a vertical width of a unit microlens. Referring to FIG. 6, based on $hP_{LH}$ 640, the horizontal width $P_{LH}$ 620 of the unit microlens 610 may be half the vertical width $P_{LV}$ 630 of the unit microlens 610.

Although the hexagonal unit microlens 610 is described as an example herein, the moire fringe reducing apparatus may be applicable to a unit microlens in other forms.

For example, the moire fringe reducing apparatus may be applied to a quadrangular unit microlens. In such an example, the moire fringe reducing apparatus may calculate a moire fringe width based on different widths of the unit microlens. Since the unit microlens is a quadrangle, the different widths of the unit microlens may include at least one of a horizontal width and a diagonal width of the unit microlens.

When the unit microlens is a quadrangle and the display screen is provided in the first example structure 510 of FIG. 5A, the moire fringe reducing apparatus may use the horizontal interval $P_{PH}$ 512 and the vertical interval $P_{PV}$ 513 between the pixels 511 as different intervals between pixels, and the horizontal width and the diagonal width of the unit microlens as different widths of a unit microlens. Thus, the moire fringe reducing apparatus may calculate a moire fringe width based on four combinations of the different intervals and the different widths. An inclination angle between the microlens array and the pixels of the display screen may be determined based on the combinations of the intervals between the pixels and the widths of the unit microlens.

According to another example embodiment, in a case of the display screen and the microlens array being separate from each other, the moire fringe reducing apparatus may calculate a moire fringe width based on a width of a unit microlens projected to the display screen. In such a case, the moire fringe reducing apparatus may calculate the moire fringe width based on a horizontal width and a diagonal width of the unit microlens projected to the display screen. The horizontal width and the diagonal width of the unit microlens projected to the display screen may be determined based on Equation 5.

Although examples of the display screen in the first example structure 510 and the hexagonal or quadrangular unit microlens are described in the foregoing, the foregoing description may be applicable to a display screen in different structures and a microlens array in different structures.

Figure 7A:
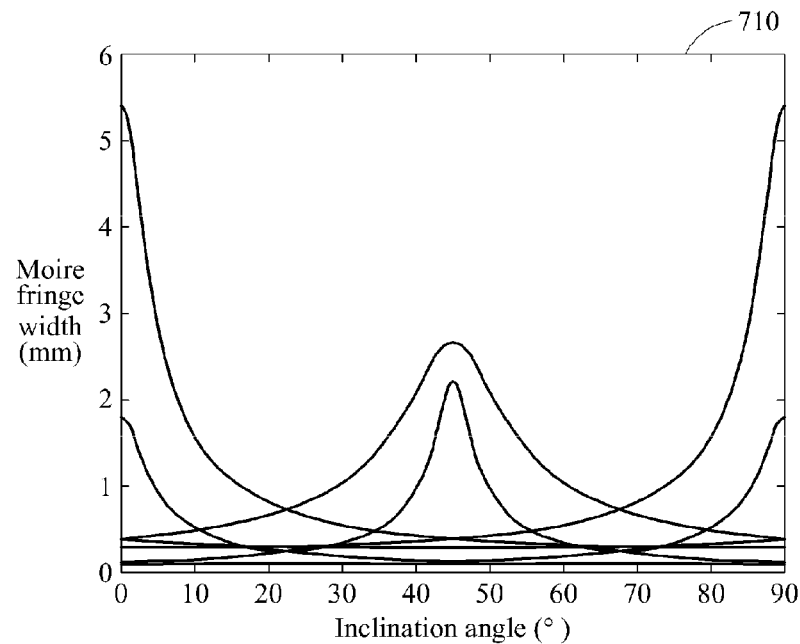
FIGS. 7A and 7B are graphs illustrating a plurality of curves for moire fringe widths calculated based on different combinations of an interval between pixels of a display screen and an inclination angle according to at least one example embodiment.
Figure 7B:
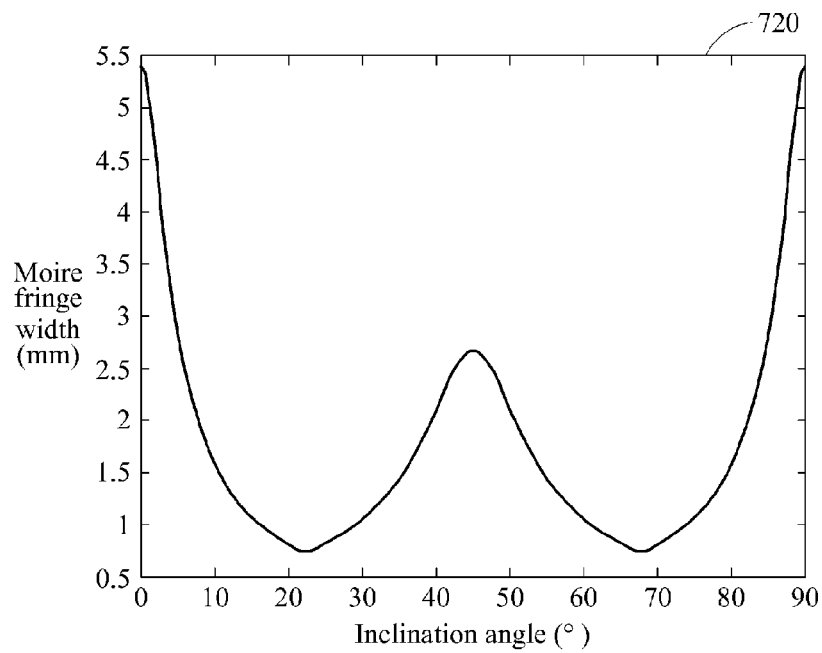
Figure 8A:
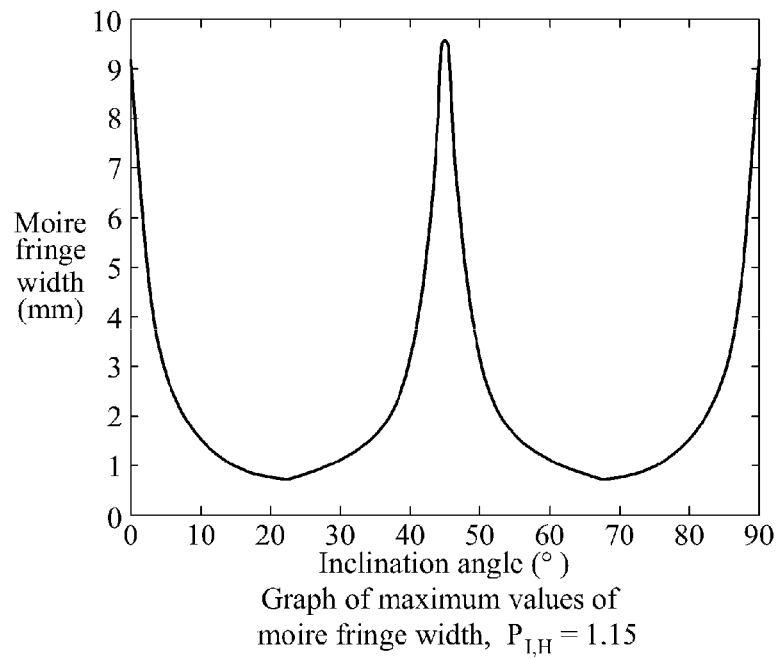
FIGS. 8A through 8F are graphs illustrating a moire fringe width based on an inclination angle in a case of a microlens array in which a form of a unit microlens is a quadrangle according to at least one example embodiment.
Figure 8B:
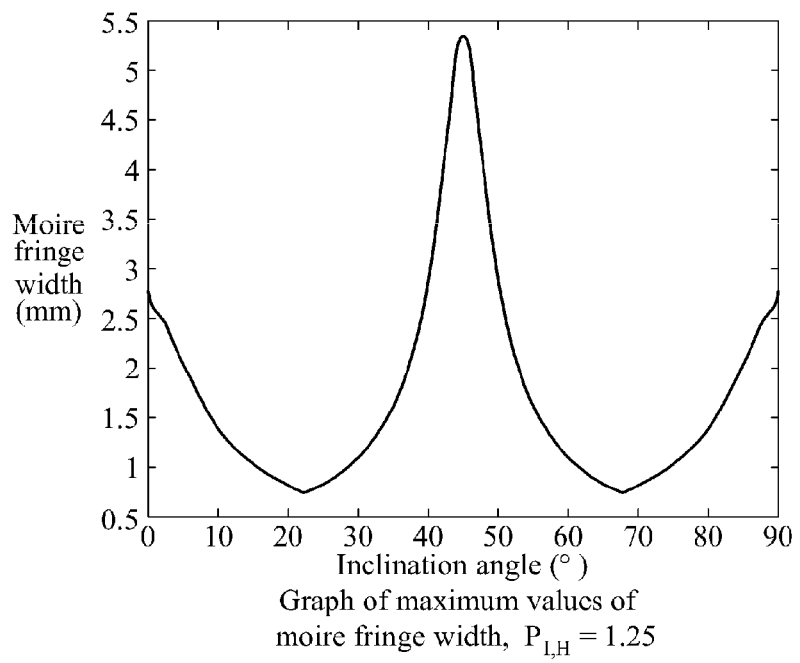
Figure 8C:
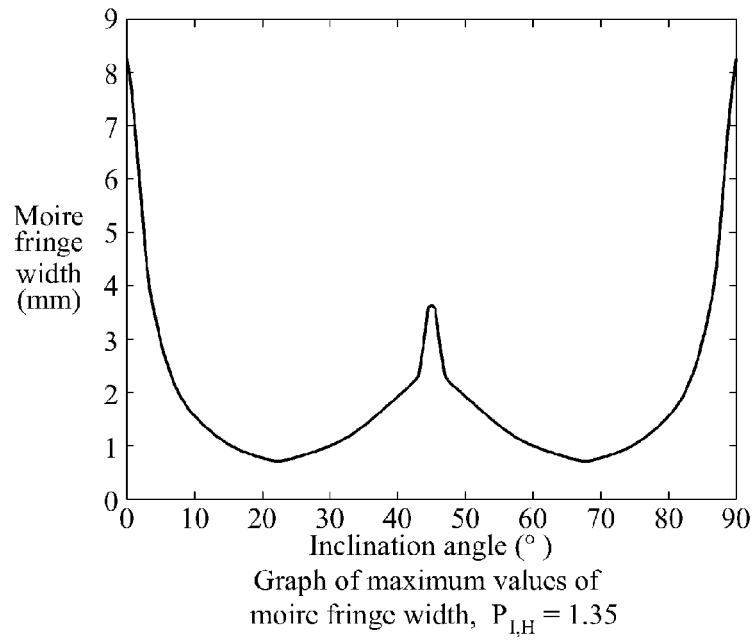
Figure 8D:
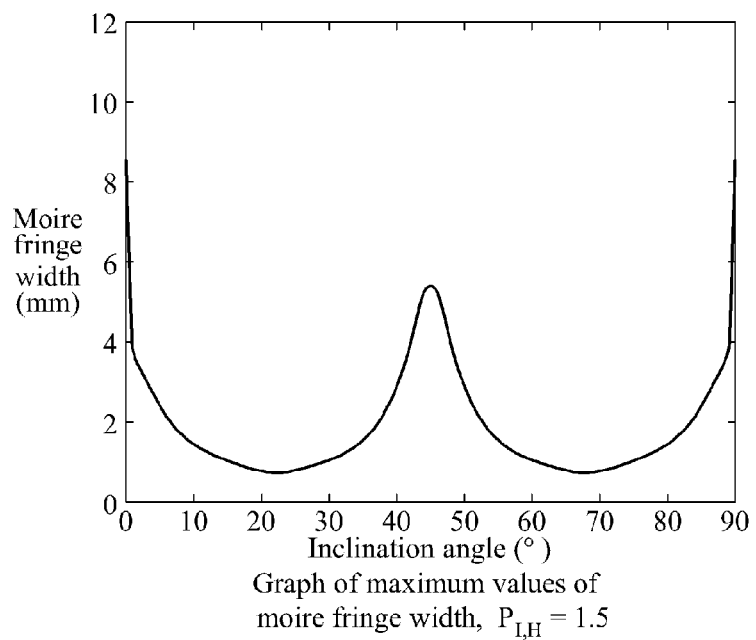
Figure 8E:
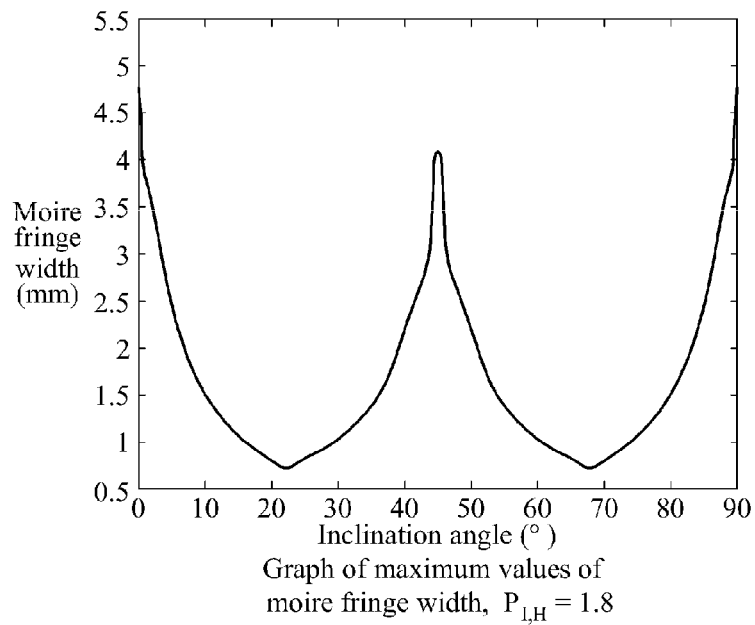
Figure 8F:
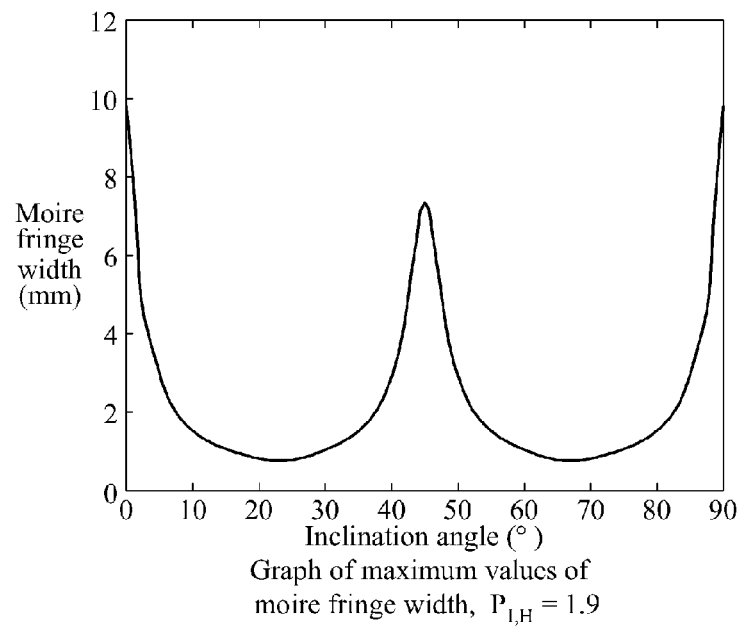
Figure 9A:
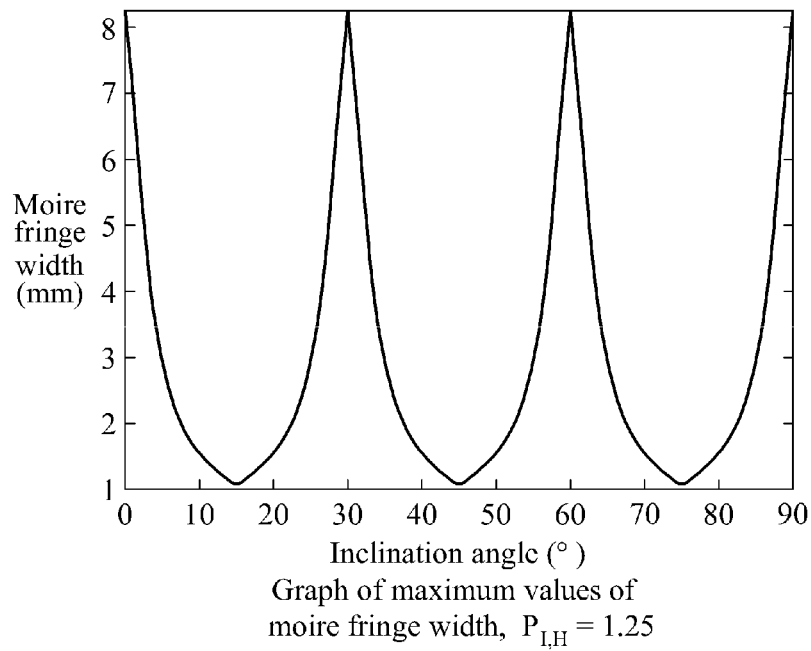
FIGS. 9A through 9D are graphs illustrating a moire fringe width based on an inclination angle in a case of a microlens array in which a form of a unit microlens is a hexagon according to at least one example embodiment.
Figure 9B:
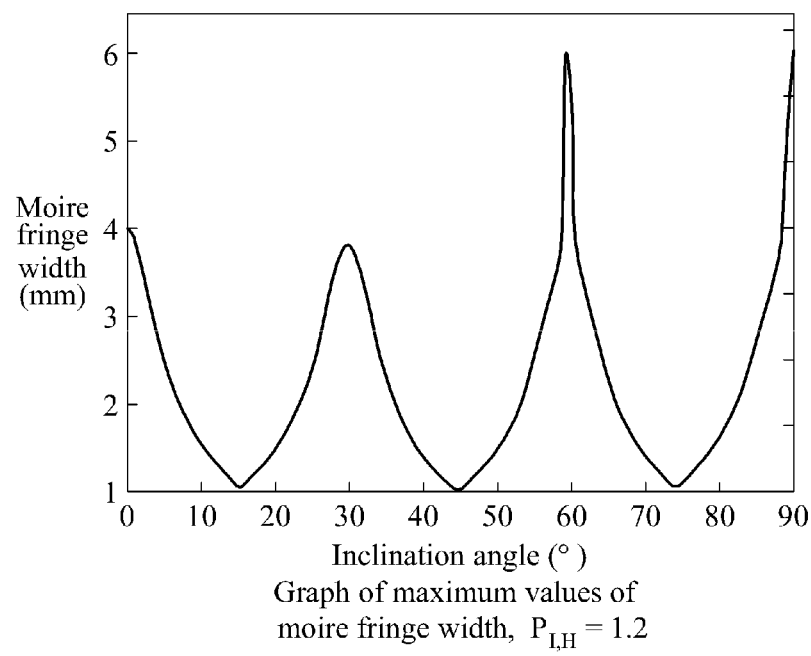
Figure 9C:
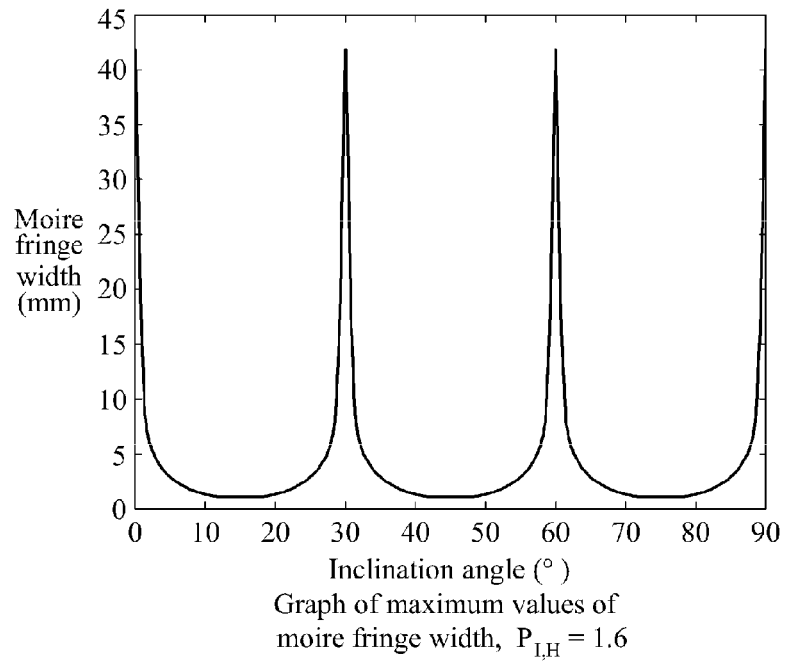
Figure 9D:
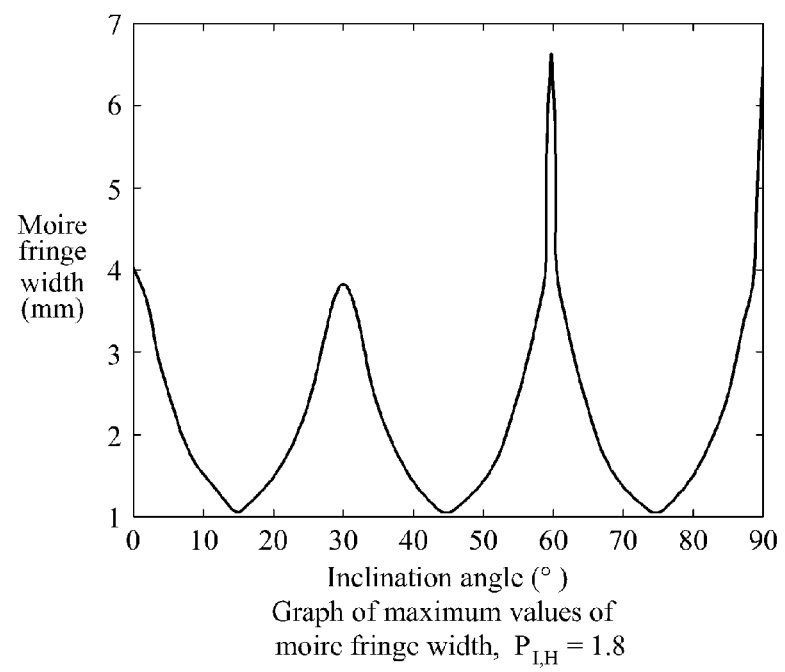

FIGS. 7A and 7B are graphs illustrating a plurality of curves for moire fringe widths calculated based on different combinations of an interval between pixels of a display screen and an inclination angle according to at least one example embodiment.

According to at least one example embodiment, a moire fringe reducing apparatus (e.g., image display engine 130) may generate a value combination by matching an interval between pixels of a display screen to an inclination angle between the pixels and a unit microlens. A black moire fringe may be generated through an interaction between a space between the pixels and a microlens array. In addition, a color moire fringe may be generated through an interaction between periodically arranged pixels or sub-pixels and the microlens array. The moire fringe reducing apparatus may generate a plurality of value combinations to comprehensively consider various moire fringes.

The moire fringe reducing apparatus may calculate a moire fringe width based on the generated value combinations and output, as a graph, a correlation between the calculated moire fringe width and the value combinations. A plurality of curves for the moire fringe width may be calculated based on the value combinations. The moire fringe reducing apparatus may collect the curves and output a first graph 710 of FIG. 7A.

The moire fringe reducing apparatus may use a maximum moire fringe width to determine an inclination angle that minimizes a moire fringe width.

Referring to FIG. 7A, the moire fringe reducing apparatus may select a maximum moire fringe width for each inclination angle in the first graph 710. The moire fringe reducing apparatus may calculate a second graph 720 of FIG. 7B including the maximum moire fringe widths.

Referring to FIG. 7B, when an inclination angle is 18 to 26 degrees or 65 to 75 degrees, the maximum moire fringe widths may become lowest. The moire fringe reducing apparatus may determine a final inclination angle between the microlens array and the display screen by referring to the second graph 720. That is, the final inclination angle may be determined in a range between 18 and 26 degrees or in a range between 65 and 72 degrees.

FIGS. 8A through 8F are graphs illustrating a moire fringe width based on an inclination angle in a case of a microlens array in which a form of a unit microlens is a quadrangle according to at least one example embodiment.

According to at least one example embodiment, a moire fringe reducing apparatus may calculate a moire fringe width based on different widths of a unit microlens. When a unit microlens is a quadrangle, the moire fringe reducing apparatus may calculate a moire fringe width based on at least one of a horizontal width of the unit microlens and a diagonal width of the unit microlens. In addition, the moire fringe reducing apparatus may generate a value combination by matching the different widths of the unit microlens to an inclination angle. The moire fringe reducing apparatus may calculate the moire fringe width based on the generated value combination, and output a result thereof in a form of a graph.

For example, the moire fringe reducing apparatus may generate a value combination by matching different widths of a quadrangular unit microlens to an inclination angle. The moire fringe reducing apparatus may calculate a moire fringe width based on the generated value combination, and select a maximum moire fringe width for each inclination angle. The moire fringe reducing apparatus may output graphs of the selected maximum more fringe widths as illustrated in FIGS. 8A through 8F. In each graph of FIGS. 8A through 8F, a width of the quadrangular unit microlens is illustrated as $P_{LH}$.

The moire fringe reducing apparatus may use the maximum moire fringe widths to determine an inclination angle that minimizes a moire fringe width. An inclination angle at which a maximum moire fringe width is lowest may be determined to be a final inclination angle between the microlens array and pixels of the display screen.

Referring to FIGS. 8A through 8F, the moire fringe reducing apparatus may determine the final inclination angle in a range between 18 and 26 degrees. Thus, the moire fringe reducing apparatus may adjust an inclination angle to be formed between the microlens array and the display screen.

FIGS. 9A through 9D are graphs illustrating a moire fringe width based on an inclination angle in a case of a microlens array in which a form of a unit microlens is a hexagon according to at least one example embodiment.

According to at least one example embodiment, a moire fringe reducing apparatus may calculate a moire fringe width based on different widths of a unit microlens. For example, when a unit microlens is a hexagon, the moire fringe reducing apparatus may calculate a moire fringe width based on at least one of a horizontal width of the unit microlens, a vertical width of the unit microlens, and a diagonal width of the unit microlens.

The moire fringe reducing apparatus may generate a value combination by matching the different widths of the hexagonal unit microlens to an inclination angle. The moire fringe reducing apparatus may calculate the moire fringe width based on the generated value combination, and select a maximum moire fringe width for each inclination angle. The moire fringe reducing apparatus may output graphs of the selected maximum moire fringe widths as illustrated in FIGS. 9A through 9D. In each graph of FIGS. 9A through 9D, a width of the hexagonal unit microlens is illustrated as $P_{LH}$. The moire fringe reducing apparatus may use the maximum moire fringe widths to determine an inclination angle that minimizes a moire fringe width.

Referring to FIGS. 9A through 9D, the moire fringe reducing apparatus may determine a final inclination angle to be formed between a display screen and a microlens array in a range between 13 and 17 degrees or in a range between 43 and 47 degrees. Thus, the moire fringe reducing apparatus may adjust an inclination angle to be formed between the display screen and the microlens array.

The units and/or modules described herein may be implemented using hardware components and software components. For example, the hardware components may include microphones, amplifiers, band-pass filters, audio to digital convertors, and processing devices. A processing device may be implemented using one or more hardware device configured to carry out and/or execute program code by performing arithmetical, logical, and input/output operations. The processing device(s) may include a processor, a controller and an arithmetic logic unit, a digital signal processor, a microcomputer, a field programmable array, a programmable logic unit, a microprocessor or any other device capable of responding to and executing instructions in a defined manner. The processing device may run an operating system (OS) and one or more software applications that run on the OS. The processing device also may access, store, manipulate, process, and create data in response to execution of the software. For purpose of simplicity, the description of a processing device is used as singular; however, one skilled in the art will appreciated that a processing device may include multiple processing elements and multiple types of processing elements. For example, a processing device may include multiple processors or a processor and a controller. In addition, different processing configurations are possible, such a parallel processors.

The software may include a computer program, a piece of code, an instruction, or some combination thereof, to independently or collectively instruct and/or configure the processing device to operate as desired, thereby transforming the processing device into a special purpose processor. Software and data may be embodied permanently or temporarily in any type of machine, component, physical or virtual equipment, computer storage medium or device, or in a propagated signal wave capable of providing instructions or data to or being interpreted by the processing device. The software also may be distributed over network coupled computer systems so that the software is stored and executed in a distributed fashion. The software and data may be stored by one or more non-transitory computer readable recording mediums.

The methods according to the above-described example embodiments may be recorded in non-transitory computer-readable media including program instructions to implement various operations of the above-described example embodiments. The media may also include, alone or in combination with the program instructions, data files, data structures, and the like. The program instructions recorded on the media may be those specially designed and constructed for the purposes of example embodiments, or they may be of the kind well-known and available to those having skill in the computer software arts. Examples of non-transitory computer-readable media include magnetic media such as hard disks, floppy disks, and magnetic tape; optical media such as CD-ROM discs, DVDs, and/or Blue-ray discs; magneto-optical media such as optical discs; and hardware devices that are specially configured to store and perform program instructions, such as read-only memory (ROM), random access memory (RAM), flash memory (e.g., USB flash drives, memory cards, memory sticks, etc.), and the like. Examples of program instructions include both machine code, such as produced by a compiler, and files containing higher level code that may be executed by the computer using an interpreter. The above-described devices may be configured to act as one or more software modules in order to perform the operations of the above-described example embodiments, or vice versa.

A number of example embodiments have been described above. Nevertheless, it should be understood that various modifications may be made to these example embodiments. For example, suitable results may be achieved if the described techniques are performed in a different order and/or if components in a described system, architecture, device, or circuit are combined in a different manner and/or replaced or supplemented by other components or their equivalents. Accordingly, other implementations are within the scope of the following claims.

What is claimed is:
1. A method of reducing a moire fringe, comprising:
calculating a moire fringe width for each of a plurality of different inclination angles between a microlens array and pixels of a display screen; and
determining, to be a final inclination angle between the microlens array and the pixels of the display screen, one of the plurality of different inclination angles that corresponds to a minimum width among the calculated moire fringe widths.

2. The method of claim 1, wherein the calculating of the moire fringe width comprises:
calculating the moire fringe width based on at least one of a plurality of different intervals between the pixels of the display screen and a plurality of different widths of a unit microlens of the microlens array.

3. The method of claim 2, wherein, when the unit microlens has a hexagonal shape, the plurality of different widths of the unit microlens comprise at least one of a horizontal width of the unit microlens, a vertical width of the unit microlens, and a diagonal width of the unit microlens.

4. The method of claim 2, wherein, when the unit microlens has a quadrangular shape, the plurality of different widths of the unit microlens comprise at least one of a horizontal width of the unit microlens and a diagonal width of the unit microlens.

5. The method of claim 1, wherein the calculating of the moire fringe width comprises:
   calculating the moire fringe width based on a width of a unit microlens of the microlens array.

6. The method of claim 5, wherein the width of the unit microlens is determined based on at least one of a desired user viewing distance and a distance between the display screen and the microlens array.

7. The method of claim 1, wherein the plurality of different inclination angles between the microlens array and the pixels of the display screen comprise at least one of i) an inclination angle formed between the microlens array and a vertical interval between the pixels, and ii) an inclination angle formed between the microlens array and a horizontal interval between the pixels.

8. The method of claim 1, wherein the determining of the final inclination angle between the microlens array and the pixels of the display screen comprises:
   determining a value combination by matching the inclination angle to an interval between the pixels; and
   determining a graph of the value combination and the moire fringe width by calculating the moire fringe width based on the value combination.

9. An apparatus for reducing a moire fringe, comprising:
   a moire fringe width calculator configured to calculate a moire fringe width for each of a plurality of different inclination angles between a microlens array and pixels of a display screen; and
   an inclination angle determiner configured to determine, to be a final inclination angle between the microlens array and the pixels of the display screen, one of the plurality of different inclination angles that corresponds to a minimum width among the calculated moire fringe widths.

10. The apparatus of claim 9, wherein the moire fringe width calculator is configured to calculate the moire fringe width based on at least one of a plurality of different intervals between the pixels of the display screen and a plurality of different widths of a unit microlens of the microlens array.

11. The apparatus of claim 9, wherein the moire fringe width calculator is configured to calculate the moire fringe width based on a width of a unit microlens of the microlens array.

12. The apparatus of claim 11, wherein the width of the unit microlens is determined based on at least one of a desired user viewing distance, and a distance between the display screen and the microlens array.

13. The apparatus of claim 9, wherein the plurality of different inclination angles between the microlens array and the pixels of the display screen comprise at least one of i) an inclination angle formed between the microlens array and a vertical interval between the pixels, and ii) an inclination angle formed between the microlens array and a horizontal interval between the pixels.

14. The apparatus of claim 9, further comprising:
   the display screen.

15. The apparatus of claim 14, wherein unit microlenses of the microlens array have a hexagonal shape.

16. A non-transitory computer-readable medium comprising program code that, when executed by a processor, causes the processor to perform the method of claim 1.

17. The apparatus of claim 9, wherein, when a unit microlens has a hexagonal shape, a plurality of different widths of the unit microlens comprise at least one of a horizontal width of the unit microlens, a vertical width of the unit microlens, and a diagonal width of the unit microlens.

18. The apparatus of claim 9, wherein a unit microlens of the microlens array have a quadrangular shape.

19. The apparatus of claim 9, wherein, when a unit microlens has a quadrangular shape, a plurality of different widths of the unit microlens comprise at least one of a horizontal width of the unit microlens and a diagonal width of the unit microlens.

20. The apparatus of claim 9, wherein the inclination angle determiner is further configured to determine the final inclination angle between the microlens array and the pixels of the display screen by:
   determining a value combination by matching the inclination angle to an interval between the pixels; and
   determining a graph of the value combination and the moire fringe width by calculating the moire fringe width based on the value combination.

* * * * *